US012406684B2

(12) United States Patent
Younes et al.

(10) Patent No.: US 12,406,684 B2
(45) Date of Patent: *Sep. 2, 2025

(54) SYSTEMS AND METHODS FOR AUTOMATIC JOINING AS A VIRTUAL MEETING PARTICIPANT FOR TRANSCRIPTION

(71) Applicant: Otter.ai, Inc., Los Altos, CA (US)

(72) Inventors: Amro Younes, Redwood City, CA (US); Winfred James, Campbell, CA (US); Tao Xing, San Jose, CA (US); Cheng Yuan, San Jose, CA (US); Yun Fu, Cupertino, CA (US); Simon Lau, San Jose, CA (US); Robert Firebaugh, Tiburon, CA (US); Sam Liang, Palo Alto, CA (US)

(73) Assignee: Otter.ai, Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/140,981

(22) Filed: Apr. 28, 2023

(65) Prior Publication Data
US 2023/0267948 A1 Aug. 24, 2023

Related U.S. Application Data

(63) Continuation of application No. 17/678,676, filed on Feb. 23, 2022, now Pat. No. 11,676,623.
(Continued)

(51) Int. Cl.
*G06F 40/30* (2020.01)
*G06F 40/169* (2020.01)
(Continued)

(52) U.S. Cl.
CPC ............ *G10L 21/10* (2013.01); *G06F 40/169* (2020.01); *G06Q 10/1095* (2013.01);
(Continued)

(58) Field of Classification Search
None
See application file for complete search history.

(56) References Cited

U.S. PATENT DOCUMENTS 6,088,669 A 7/2000 Maes
6,363,352 B1 3/2002 Dailey et al.
(Continued)

FOREIGN PATENT DOCUMENTS

CN 111164676 5/2020
JP 3376487 5/2001
(Continued)

OTHER PUBLICATIONS

Basu et al., "An Overview of Speaker Diarization: Approaches, Resources and Challenges," 2016 Conference of The Oriental Chapter of International Committee for Coordination and Standardization of Speechx Databases and Assessment Technique (O-COCOSDA), Bali, Indonesia, Oct. 26-28, 2016.
(Continued)

*Primary Examiner* — Jakieda R Jackson
(74) *Attorney, Agent, or Firm* — Faegre Drinker Biddle & Reath LLP

(57) ABSTRACT

Method, system, device, and non-transitory computer-readable medium for joining a virtual participant in a conversation. In some examples, a computer-implemented method includes: identifying a first conversation scheduled to be participated by a first group of actual participants; joining a first virtual participant into the first conversation; obtaining, via the first virtual participant, a first set of audio data associated with the first conversation while the first conversation occurs; transcribing, via the first virtual participant, the first set of audio data into a first set of text data while the
(Continued)

first conversation occurs; and presenting the first set of text data to the first group of actual participants while the first conversation occurs.

18 Claims, 8 Drawing Sheets

Related U.S. Application Data

(60) Provisional application No. 63/154,271, filed on Feb. 26, 2021.

(51) Int. Cl.
  *G06Q 10/1093* (2023.01)
  *G10L 17/02* (2013.01)
  *G10L 17/14* (2013.01)
  *G10L 21/10* (2013.01)
  *H04L 65/403* (2022.01)

(52) U.S. Cl.
  CPC .............. *G10L 17/02* (2013.01); *G10L 17/14* (2013.01); *H04L 65/403* (2013.01)

(56) References Cited

U.S. PATENT DOCUMENTS

| | | |
|---|---|---|
| 6,434,520 B1 | 8/2002 | Kanevsky et al. |
| 6,513,003 B1 | 1/2003 | Angell et al. |
| 8,407,049 B2 | 3/2013 | Cromack et al. |
| 8,612,211 B1 | 12/2013 | Shires et al. |
| 8,645,138 B1 | 2/2014 | Weinstein |
| 8,818,803 B2 | 8/2014 | Weber |
| 9,311,932 B2 | 4/2016 | Carter |
| 9,443,518 B1 | 9/2016 | Gauci |
| 9,571,652 B1 | 2/2017 | Zeppenfeld et al. |
| 10,339,918 B2 | 7/2019 | Hofer et al. |
| 10,388,272 B1 | 8/2019 | Thomson et al. |
| 10,573,312 B1 | 2/2020 | Thomson et al. |
| 10,616,278 B1 | 4/2020 | Johansson et al. |
| 10,630,733 B2 | 4/2020 | Modai et al. |
| 10,978,073 B1 | 4/2021 | Fu et al. |
| 11,012,575 B1 | 5/2021 | Leblang et al. |
| 11,017,778 B1 | 5/2021 | Thomson et al. |
| 11,024,316 B1 | 6/2021 | Fu et al. |
| 11,100,943 B1 | 8/2021 | Fu et al. |
| 11,222,185 B2 | 1/2022 | Waibel et al. |
| 11,330,229 B1 | 5/2022 | Crumley et al. |
| 11,330,299 B2 | 5/2022 | Huo |
| 11,423,911 B1 | 8/2022 | Fu et al. |
| 11,431,517 B1 | 8/2022 | Fu et al. |
| 11,657,822 B2 | 5/2023 | Fu et al. |
| 11,676,623 B1 | 6/2023 | Younes et al. |
| 11,869,508 B2 | 1/2024 | Fu et al. |
| 12,020,722 B2 | 6/2024 | Fu et al. |
| 12,080,299 B2 | 9/2024 | Lau et al. |
| 2002/0099552 A1 | 7/2002 | Rubin et al. |
| 2004/0107256 A1 | 6/2004 | Odenwald et al. |
| 2004/0117446 A1 | 6/2004 | Swanson |
| 2005/0034079 A1 | 2/2005 | Gunasekar et al. |
| 2005/0152523 A1 | 7/2005 | Fellenstein et al. |
| 2006/0149558 A1 | 7/2006 | Kahn et al. |
| 2006/0182249 A1 | 8/2006 | Archambault et al. |
| 2007/0071206 A1 | 3/2007 | Gainsboro et al. |
| 2007/0106724 A1 | 5/2007 | Gorti et al. |
| 2007/0118374 A1 | 5/2007 | Wise et al. |
| 2007/0183458 A1 | 8/2007 | Bouazizi et al. |
| 2008/0181417 A1 | 7/2008 | Pereg et al. |
| 2008/0293443 A1 | 11/2008 | Pettinato |
| 2008/0294434 A1 | 11/2008 | Pettinato |
| 2008/0300872 A1 | 12/2008 | Basu et al. |
| 2009/0019367 A1 | 1/2009 | Cavagnari et al. |
| 2009/0030680 A1 | 1/2009 | Mamou |
| 2009/0210391 A1 | 8/2009 | Hall et al. |
| 2009/0240488 A1 | 9/2009 | White et al. |
| 2009/0306981 A1 | 12/2009 | Cromack et al. |
| 2009/0307189 A1 | 12/2009 | Bobbitt et al. |
| 2010/0146438 A1 | 6/2010 | Bush et al. |
| 2011/0228922 A1 | 9/2011 | Dhara et al. |
| 2011/0307241 A1 | 12/2011 | Waibel et al. |
| 2011/0320197 A1 | 12/2011 | Conejero et al. |
| 2012/0046936 A1 | 2/2012 | Kandekar et al. |
| 2012/0253805 A1 | 10/2012 | Rajakumar et al. |
| 2012/0275761 A1 | 11/2012 | Li et al. |
| 2012/0281921 A1 | 11/2012 | Dowell |
| 2012/0310644 A1 | 12/2012 | Zimmerman et al. |
| 2012/0323575 A1 | 12/2012 | Gibbon et al. |
| 2012/0324355 A1 | 12/2012 | Mbenkum et al. |
| 2013/0144603 A1 | 6/2013 | Lord et al. |
| 2013/0300939 A1 | 11/2013 | Chou et al. |
| 2013/0311177 A1 | 11/2013 | Bastide et al. |
| 2013/0346077 A1 | 12/2013 | Mengibar et al. |
| 2014/0029757 A1 | 1/2014 | Aronowitz et al. |
| 2014/0134576 A1 | 5/2014 | Edge |
| 2014/0136999 A1 | 5/2014 | Leibovich et al. |
| 2014/0207449 A1 | 7/2014 | Johnson |
| 2015/0012844 A1 | 1/2015 | Paulik et al. |
| 2015/0206544 A1 | 7/2015 | Carter |
| 2015/0249747 A1 | 9/2015 | Box et al. |
| 2015/0255068 A1 | 9/2015 | Kim et al. |
| 2015/0310863 A1 | 10/2015 | Chen et al. |
| 2016/0004732 A1 | 1/2016 | Hsu et al. |
| 2016/0014222 A1 | 1/2016 | Chen et al. |
| 2016/0284354 A1 | 9/2016 | Chen et al. |
| 2016/0322049 A1 | 11/2016 | Bakshi et al. |
| 2017/0068423 A1 | 3/2017 | Napolitano |
| 2017/0068670 A1 | 3/2017 | Orr |
| 2017/0070706 A1 | 3/2017 | Ursin et al. |
| 2017/0169816 A1 | 6/2017 | Blandin et al. |
| 2017/0180780 A1 | 6/2017 | Jeffries |
| 2017/0199934 A1 | 7/2017 | Nongpiur |
| 2017/0294184 A1 | 10/2017 | Bradley |
| 2017/0301037 A1 | 10/2017 | Baughman et al. |
| 2017/0329943 A1 | 11/2017 | Choi et al. |
| 2017/0372693 A1 | 12/2017 | Rangarajan Sridhar et al. |
| 2018/0007060 A1 | 1/2018 | Leblang et al. |
| 2018/0012598 A1 | 1/2018 | Thirukovalluru |
| 2018/0032226 A1 | 2/2018 | Ryu et al. |
| 2018/0061083 A1 | 3/2018 | Suzuki et al. |
| 2018/0143956 A1 | 5/2018 | Skarbovsky et al. |
| 2018/0174108 A1 | 6/2018 | Kang et al. |
| 2018/0197548 A1 | 7/2018 | Palakodety et al. |
| 2018/0315428 A1 | 11/2018 | Johnson et al. |
| 2018/0316893 A1 | 11/2018 | Rosenberg et al. |
| 2019/0073640 A1 | 3/2019 | Odezue et al. |
| 2019/0273767 A1 | 9/2019 | Nelson et al. |
| 2019/0341050 A1 | 11/2019 | Diamant et al. |
| 2019/0364009 A1 | 11/2019 | Joseph et al. |
| 2020/0051582 A1 | 2/2020 | Gilson |
| 2020/0145616 A1 | 5/2020 | Nassar |
| 2020/0175961 A1 | 6/2020 | Thomson et al. |
| 2020/0228358 A1 | 7/2020 | Rampton |
| 2020/0243095 A1 | 7/2020 | Adlersberg et al. |
| 2020/0257587 A1 | 8/2020 | Chau et al. |
| 2020/0311122 A1 | 10/2020 | Ramamurthy |
| 2020/0365160 A1 | 11/2020 | Nassar et al. |
| 2020/0403818 A1 | 12/2020 | Daredia et al. |
| 2020/0412564 A1 | 12/2020 | Roedel et al. |
| 2021/0021558 A1 | 1/2021 | Mahmoud et al. |
| 2021/0044645 A1 | 2/2021 | Jayaweera |
| 2021/0058263 A1 | 2/2021 | Fahrendorff et al. |
| 2021/0058517 A1 | 2/2021 | Serbajlo et al. |
| 2021/0092168 A1 | 3/2021 | Ranalli et al. |
| 2021/0150211 A1 | 5/2021 | Ahmad Hambaly et al. |
| 2021/0217420 A1 | 7/2021 | Fu et al. |
| 2021/0319797 A1 | 10/2021 | Fu et al. |
| 2021/0327454 A1 | 10/2021 | Fu et al. |
| 2021/0367802 A1 | 11/2021 | Yarlagadda |
| 2021/0369042 A1 | 12/2021 | Gustman et al. |
| 2021/0374391 A1 | 12/2021 | Jorasch |
| 2021/0390144 A1 | 12/2021 | Ganesh |
| 2021/0407520 A1 | 12/2021 | Neckermann et al. |
| 2021/0409547 A1 | 12/2021 | Channapragada et al. |
| 2022/0122436 A1 | 4/2022 | Volkerink et al. |

(56) References Cited

U.S. PATENT DOCUMENTS

| | | |
|---|---|---|
| 2022/0343918 A1 | 10/2022 | Fu et al. |
| 2022/0353102 A1 | 11/2022 | Lau et al. |
| 2022/0385758 A1 | 12/2022 | Tadesse et al. |
| 2022/0398544 A1 | 12/2022 | Chung |
| 2022/0414130 A1 | 12/2022 | Master Ben-Dor |
| 2023/0245660 A1 | 8/2023 | Fu et al. |
| 2023/0297765 A1 | 9/2023 | Vendrow |
| 2023/0325611 A1 | 10/2023 | Garg et al. |
| 2024/0037145 A1 | 2/2024 | Ziccardi et al. |
| 2024/0087574 A1 | 3/2024 | Fu et al. |
| 2024/0095440 A1 | 3/2024 | Rony et al. |
| 2024/0127804 A1 | 4/2024 | Shirodkar |
| 2024/0170006 A1 | 5/2024 | Fu et al. |
| 2024/0205037 A1 | 6/2024 | Callegari |
| 2024/0338860 A1 | 10/2024 | Trzyna |
| 2024/0340193 A1 | 10/2024 | Zhu |
| 2025/0117128 A1 | 4/2025 | Omoigui |

FOREIGN PATENT DOCUMENTS

| | | |
|---|---|---|
| JP | 2018190431 | 11/2018 |
| JP | 6542983 | 7/2019 |

OTHER PUBLICATIONS

Tur et al., "The CALO Meeting Assistant System," *IEEE Transactions on Audio, Speech, and Language Processing*, vol. 18, No. 6, pp. 1601-1611, Aug. 2010.

United States Patent and Trademark Office, Office Action mailed May 11, 2023, in U.S. Appl. No. 17/210,108.

United States Patent and Trademark Office, Office Action mailed Dec. 8, 2022, in U.S. Appl. No. 17/242,465.

United States Patent and Trademark Office, Office Action mailed Apr. 5, 2023, in U.S. Appl. No. 17/242,465.

United States Patent and Trademark Office, Office Action mailed Dec. 7, 2022, in U.S. Appl. No. 17/863,837.

United States Patent and Trademark Office, Office Action mailed Jul. 5, 2023, in U.S. Appl. No. 17/863,837.

United States Patent and Trademark Office, Office Action mailed Dec. 7, 2022, in U.S. Appl. No. 17/863,881.

United States Patent and Trademark Office, Office Action mailed Jul. 5, 2023, in U.S. Appl. No. 17/863,881.

United States Patent and Trademark Office, Office Action mailed Jun. 8, 2023, in U.S. Appl. No. 18/127,343.

United States Patent and Trademark Office, Notice of Allowance mailed Oct. 12, 2023, in U.S. Appl. No. 17/210,108.

United States Patent and Trademark Office, Office Action mailed Oct. 17, 2023, in U.S. Appl. No. 17/863,837.

United States Patent and Trademark Office, Office Action mailed Oct. 24, 2023, in U.S. Appl. No. 17/863,881.

United States Patent and Trademark Office, Office Action mailed Sep. 20, 2023, in U.S. Appl. No. 18/127,343.

United States Patent and Trademark Office, Notice of Allowance mailed Dec. 13, 2023, in U.S. Appl. No. 18/127,343.

United States Patent and Trademark Office, Office Action mailed Nov. 15, 2023, in U.S. Appl. No. 18/131,982.

United States Patent and Trademark Office, Office Action mailed Jun. 5, 2024, in U.S. Appl. No. 17/863,837.

United States Patent and Trademark Office, Office Action mailed Sep. 9, 2024, in U.S. Appl. No. 17/863,837.

United States Patent and Trademark Office, Notice of Allowance mailed Mar. 25, 2024, in U.S. Appl. No. 18/127,343.

United States Patent and Trademark Office, Notice of Allowance mailed Aug. 15, 2024, in U.S. Appl. No. 18/127,343.

United States Patent and Trademark Office, Office Action mailed Apr. 4, 2024, in U.S. Appl. No. 18/131,982.

United States Patent and Trademark Office, Office Action mailed Jul. 26, 2024, in U.S. Appl. No. 18/131,982.

United States Patent and Trademark Office, Office Action mailed Aug. 15, 2024, in U.S. Appl. No. 18/514,666.

United States Patent and Trademark Office, Office Action mailed Mar. 29, 2024, in U.S. Appl. No. 18/438,145.

United States Patent and Trademark Office, Notice of Allowance mailed Jul. 23, 2024, in U.S. Appl. No. 18/438,145.

United States Patent and Trademark Office, Office Action mailed Sep. 10, 2024, in U.S. Appl. No. 18/673,235.

United States Patent and Trademark Office, Office Action mailed Aug. 13, 2024, in U.S. Appl. No. 18/744,259.

United States Patent and Trademark Office, Office Action mailed Oct. 11, 2024, in U.S. Appl. No. 18/438,145.

United States Patent and Trademark Office, Office Action mailed Jan. 22, 2025, in U.S. Appl. No. 18/131,982.

United States Patent and Trademark Office, Office Action mailed Jan. 24, 2025, in U.S. Appl. No. 18/514,666.

United States Patent and Trademark Office, Office Action mailed Feb. 6, 2025, in U.S. Appl. No. 18/438,145.

United States Patent and Trademark Office, Office Action mailed Jan. 28, 2025, in U.S. Appl. No. 18/673,235.

United States Patent and Trademark Office, Office Action mailed Feb. 7, 2025, in U.S. Appl. No. 18/744,259.

United States Patent and Trademark Office, Office Action mailed Jan. 29, 2025, in U.S. Appl. No. 18/737,530.

United States Patent and Trademark Office, Notice of Allowance mailed Mar. 26, 2025, in U.S. Appl. No. 17/863,837.

United States Patent and Trademark Office, Notice of Allowance mailed May 8, 2025, in U.S. Appl. No. 17/863,837.

United States Patent and Trademark Office, Notice of Allowance mailed Jun. 23, 2025, in U.S. Appl. No. 18/131,982.

United States Patent and Trademark Office, Notice of Allowance mailed Apr. 25, 2025, in U.S. Appl. No. 18/514,666.

United States Patent and Trademark Office, Notice of Allowance mailed Jul. 8, 2025, in U.S. Appl. No. 18/673,235.

United States Patent and Trademark Office, Notice of Allowance mailed Jul. 8, 2025, in U.S. Appl. No. 18/737,530.

SYSTEMS AND METHODS FOR AUTOMATIC JOINING AS A VIRTUAL MEETING PARTICIPANT FOR TRANSCRIPTION

CROSS-REFERENCES TO RELATED APPLICATIONS

This application is a continuation of U.S. patent application Ser. No. 17/678,676, filed Feb. 23, 2022, which claims priority to Provisional Patent Application No. 63/154,271, filed Feb. 26, 2021, both applications being incorporated herein by reference in their entirety for all purposes. U.S. patent application Ser. No. 16/027,511, U.S. patent application Ser. No. 16/276,446, U.S. patent application Ser. No. 16/403,263, U.S. patent application Ser. No. 16/598,820, and U.S. patent application Ser. No. 16/780,630 are incorporated by reference herein for all purposes.

FIELD OF THE DISCLOSURE

Some embodiments of the present disclosure are directed to signal processing. More particularly, certain embodiments of the present disclosure provide systems and methods for automatic joining as a virtual meeting participant for transcription. Merely by way of example, the present disclosure has been applied to conversations captured in audio form, but it would be recognized that the present disclosure has much broader range of applicability.

BACKGROUND

Conversations, such as human-to-human conversations, include information that is often difficult to comprehensively, efficiently, and accurately extract, using conventional methods and systems. For example, conventional notetaking performed during a conversation not only distracts the note-taker from the conversation but can also lead to inaccurate recordation of information due to human-error, such as for human's inability to multitask well and process information efficiently with high accuracy in real time. Hence it is highly desirable to provide systems and methods for capturing, processing, and rendering conversations (e.g., in an automatic manner) to increase the value of conversations, such as human-to-human conversations, at least by increasing the comprehensiveness and accuracy of information extractable from the conversations.

BRIEF SUMMARY OF THE DISCLOSURE

Some embodiments of the present disclosure are directed to signal processing. More particularly, certain embodiments of the present disclosure provide systems and methods for automatic joining as a virtual meeting participant for transcription. Merely by way of example, the present disclosure has been applied to conversations captured in audio form, but it would be recognized that the present disclosure has much broader range of applicability.

According to various embodiments, a computer-implemented method for, a system for, and a non-transitory computer-readable medium storing instructions upon execution by one or more processors of a computing system cause the computing system to perform one or more processes including: identifying a first conversation scheduled to be participated by a first group of actual participants; joining a first virtual participant into the first conversation; obtaining, via the first virtual participant, a first set of audio data associated with the first conversation while the first conversation occurs; transcribing, via the first virtual participant, the first set of audio data into a first set of text data while the first conversation occurs; and presenting the first set of text data to the first group of actual participants while the first conversation occurs.

Depending upon the embodiment, one or more benefits may be achieved. These benefits, features, and advantages of the present disclosure can be fully appreciated with reference to the detailed description and accompanying drawings that follow.

Figure 1:
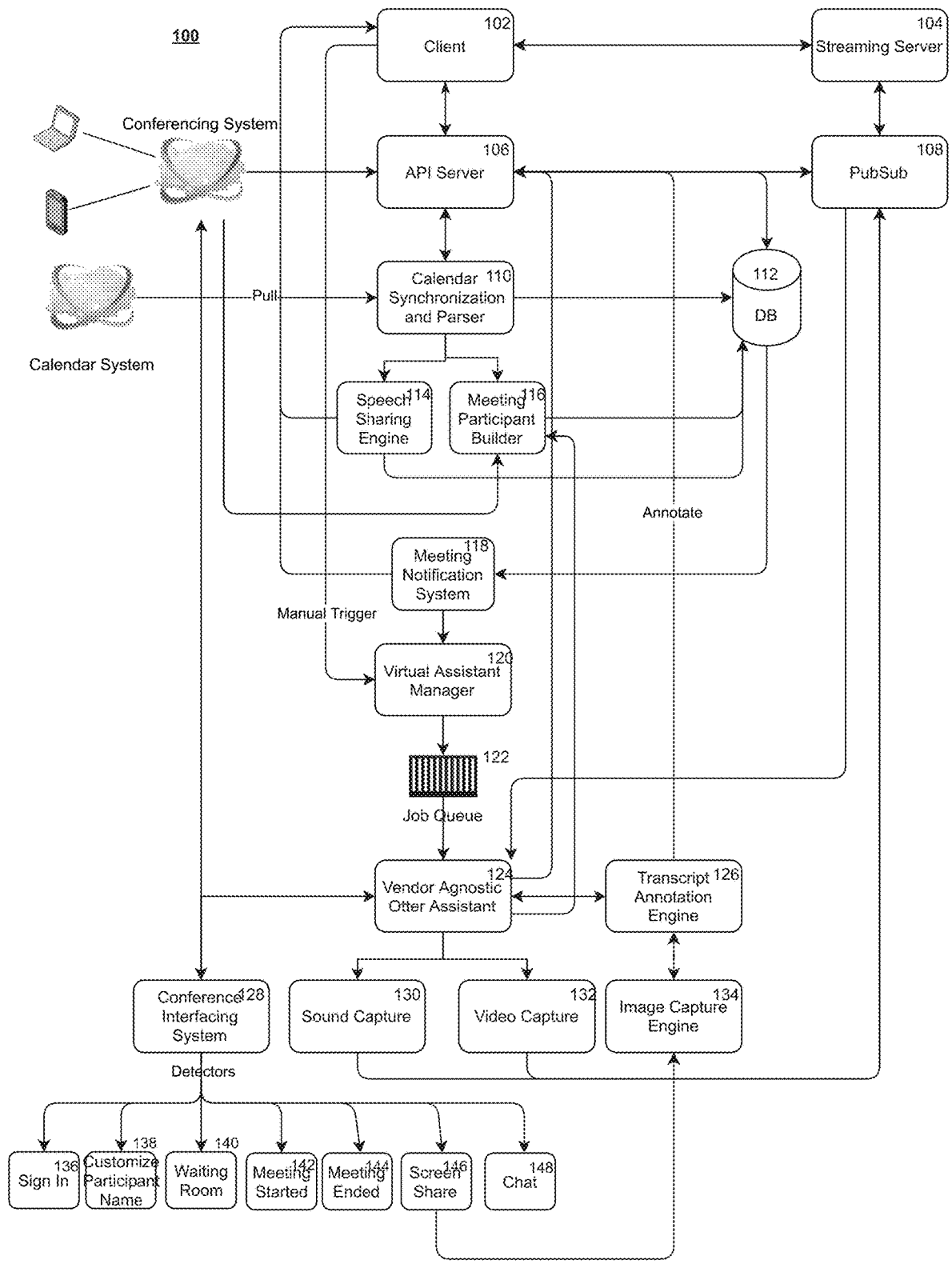
FIG. 1 is a simplified diagram showing a system for automatic joining as a virtual meeting participant for transcription according to various embodiments of the present disclosure.

While the present disclosure is amenable to various modifications and alternative forms, specific embodiments have been shown by way of example in the drawings and are described in detail below. The intention, however, is not to limit the present disclosure to the particular embodiments described. On the contrary, the present disclosure is intended to cover all modifications, equivalents, and alternatives falling within the scope of the present disclosure as defined by the appended claims.

DETAILED DESCRIPTION OF THE DRAWINGS

Some embodiments of the present disclosure are directed to signal processing. More particularly, certain embodiments of the present disclosure provide systems and methods for automatic joining as a virtual meeting participant for transcription. Merely by way of example, the present disclosure has been applied to conversations captured in audio form, but it would be recognized that the present disclosure has much broader range of applicability.

In various embodiments, systems and/or methods of the present disclosure join a virtual assistant into a meeting, such as a meeting of a synced calendar of a user, at least to transcribe, record, and/or share the meeting notes (e.g., of a conversation). In some examples, systems and/or methods of the present disclosure integrate one or more calendars and automatically identify meetings for the virtual assistant to join as a participant at least for transcribing the meetings. In certain examples, the virtual assistant may join with or without a user which the virtual assistant is associated with. In some examples, the virtual assistant may join the meeting chat with other meeting participants, such as to share notes taken during the meeting and/or to invite meting participants to provide annotations to the meeting notes. In some examples, the virtual assistant may record one or more images of a meeting (e.g., a presentation) and may associate the one or more images with the transcript of the meeting. In some examples, the virtual assistant is a named participant of the meeting once joined. In certain examples, the virtual assistant may have a plurality of settings adjustable by a user such that the automatic notes-taking, transcribing, and/or recording may be tailored for a specific focus (e.g., topic, speaker). In some examples, when multiple virtual assistants join a meeting, they may, such as upon approval by the associated user, collaborate in creating a master transcription of the meeting. In various examples, the transcripts may be provided to meeting participants in real-time during the meeting, such as to allow meeting participants to modify, annotate, and/or copy.

In certain embodiments, systems and/or methods of the present disclosure provide a virtual assistant who, upon determining a meeting of a synced calendar is about to start, automatically opens a corresponding meeting application, automatically enters meeting credentials and user credentials, and joins the meeting as a named participant. The virtual assistant may be placed in a waiting room until a host of the meeting allows the virtual assistant to join the meeting as an active participant. Once joined, the virtual assistant may begin to transcribe, to record, and/or to share its transcription and/or recordings, such as to an associated user and/or the meeting participants.

In certain embodiments, systems and/or methods of the present disclosure provide a virtual assistant who may be configured to join a lecture to take notes for a user. In some examples, the virtual assistant automatically begins transcribing and/or recording the lecture, which may include presentation slides. In some examples, the virtual assistant may share the transcript and/or recording with one or more other users (e.g., meeting participants), and/or notify the meeting participants and/or host that it is representing a user in or not in attendance of the event, and that the event may be recorded. In some examples, the virtual assistant provides a link to the live transcription to the chat such that the meeting participants may view and/or edit the transcription.

In various embodiments, systems and/or methods of the present disclosure provide a virtual assistant which may be integrated into an application containing other functions or be a stand-alone application.

In some examples, systems and/or methods of the present disclosure utilize image identification, such as during automatic opening of a meeting application, automatic entering of meeting credentials, and/or automatic entering of user credentials.

In some examples, systems and/or methods of the present disclosure provide a virtual assistant which may automatically join a plurality of meetings (e.g., synced meetings) of one or more platforms (e.g., Google, Microsoft, Zoom), such as sequentially.

In some examples, systems and/or methods of the present disclosure provide a virtual assistant which may automatically generate a text file, an audio file, and/or a video file, such as shareable with meeting participants and/or consumable by a user, such as after the meeting.

In some examples, systems and/or methods of the present disclosure joins or joins as a virtual assistant into an event, such as a conference meeting, a webinar, a virtual gathering of people, such as to record, transcribe, and/or share the event.

In some examples, systems and/or methods of the present disclosure joins, or joins as, a virtual meeting participant for transcription into an event, such as automatically. For example, upon calendar integration, systems and/or methods of the present disclosure may detect an event is about to start and joins, or joins as, a virtual meeting participant into the event to at least transcribe the meeting, such as a meeting conversation.

FIG. 1 is a simplified diagram showing a system 100 for automatic joining as a virtual meeting participant for transcription according to various embodiments of the present disclosure. This diagram is merely an example, which should not unduly limit the scope of the claims. One of ordinary skill in the art would recognize many variations, alternatives, and modifications. In some examples, the system 100 includes a client device 102, a streaming server 104, an API server 106, a Pub Sub module 108, a calendar synchronization and parser module 110, a database 112, a speech sharing engine 114, a meeting participant builder 116, a meeting notification system 118, a virtual assistant manager 120, a job queue module 122, a vendor agnostic Otter assistant module 124, a transcript annotation engine 126, a conference interfacing system 128, a sound capturing module 130, a video capturing module 132, an image capturing engine 134, and a plurality of sub-modules. Although the above has been shown using a selected group of components, there can be many alternatives, modifications, and variations. In some examples, some of the components may be expanded and/or combined. Some components may be removed. Other components may be inserted to those noted above. Depending upon the embodiment, the arrangement of components may be interchanged with others replaced.

In some examples, the plurality of sub-modules includes a sign in module 136 for signing in, a customization module 138 for customizing participant name, a waiting room module 140, a meeting start module 142, a meeting end module 144, a screen share module 146, and/or a chat module 148. One or more of the modules may work with a detector or includes a detector to perform its function.

In some examples, the plurality of detectors works with the conference interfacing system 128 to perform one or more actions, such as signing in, customizing participant name, managing a waiting room, starting a meeting, ending a meeting, detecting a screen share, and/or participating in chat.

In some examples, the calendar synchronization and parser module 110 is configured to pull calendar information from a calendar system, such as an external calendar system, such as a calendar system operated by a third-party.

In some examples, the conference interfacing system 128 is configured to interact with a conferencing system, such as an external conferencing system, such as one operated by a third-party. In certain examples, the conferencing system is accessible by a plurality of devices, such as a plurality of mobile devices of a plurality of users.

In some examples, the client module 102 may manually launch the virtual assistant manager 120 to perform one or more actions.

In some examples, the transcript annotation engine 126 is configured to annotate captured content (e.g., video, picture, audio) and/or transmit the annotated captured content to the API server 106.

Figure 2:
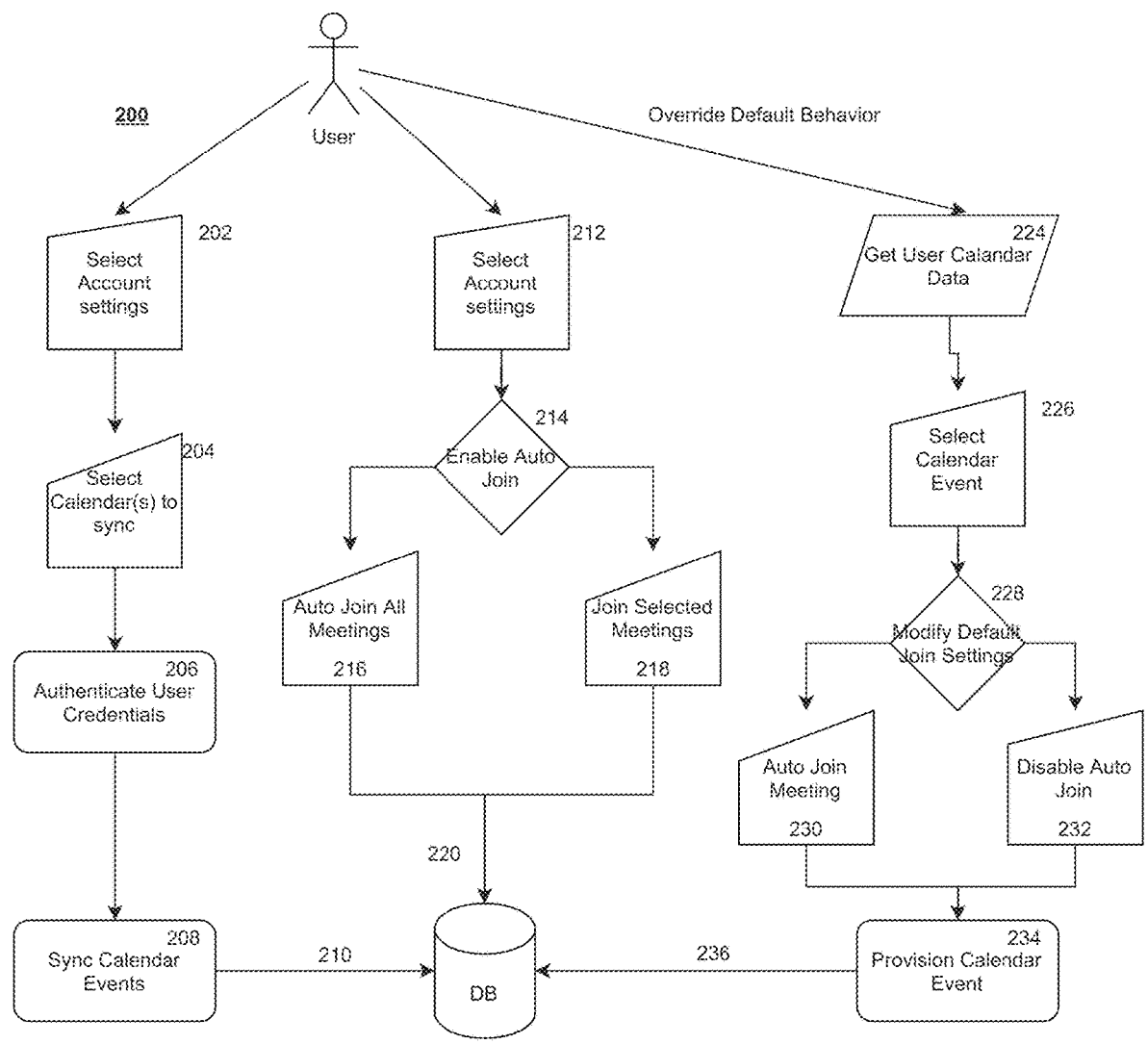
FIG. 2 is a simplified diagram showing a method for automatic joining as a virtual meeting participant for transcription leveraging calendar integration according to various embodiments of the present disclosure.

FIG. 2 is a simplified diagram showing a method 200 for automatic joining as a virtual meeting participant for transcription leveraging calendar integration according to various embodiments of the present disclosure. This diagram is merely an example, which should not unduly limit the scope of the claims. One of ordinary skill in the art would recognize many variations, alternatives, and modifications. In some examples, the method 200 includes a process 202 of selecting account settings, a process 204 of selecting a calendar(s) to sync, a process 206 of authenticating user credentials, a process 208 of syncing calendar events, and a process 210 of transmitting calendar data to a database. In some examples, the method 200 includes a process 212 of selecting account settings, a process 214 of enabling auto join, a process 216 of auto joining all meetings or a process 218 of joining selected meetings, and a process 220 of transmitting meeting data to a database. In some examples, the method 200 includes a sequence of processes for overriding default behavior, which may include a process 224 of obtaining user calendar data, a process 226 of selecting a calendar event, a process 228 of modifying default join settings, a process 230 of auto joining meetings or a process 232 of disable auto joining a calendar event, a process 234 of provisioning calendar event(s), and a process 234 of transmitting meeting data to a database. Although the above has been shown using a selected group of processes for the method, there can be many alternatives, modifications, and variations. In some examples, some of the processes may be expanded and/or combined. Other processes may be inserted to those noted above. Depending upon the embodiment, the sequence of processes may be interchanged with others replaced. In some examples, some or all processes of the method are performed by a computing device or a processor directed by instructions stored in memory. As an example, some or all processes of the method are performed according to instructions stored in a non-transitory computer-readable medium.

In some examples, one or more of process 202, process 204, process 212, process 214, process 216, process 218, process 226, process 228, process 230, and/or process 232 may be performed by module 106. In some examples, one or more of process 206, process 208, and/or process 234 may be performed by module 110. In some examples, process 210, process 220, and/or process 236 may be performed by module 110. In some examples, process 224 may be performed by module 106.

In some examples, the method 200 includes integrating one or more calendars to achieve fully or near fully automated joining of a virtual assistant into one or more meetings or events on the synced calendar for at least transcription purposes.

Figure 3:
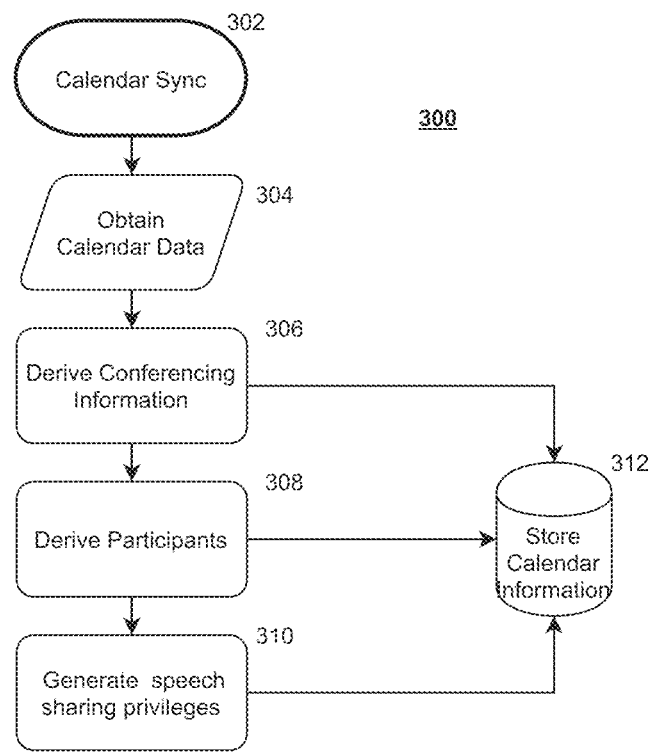
FIG. 3 is a simplified diagram showing a method for calendar synchronization and integration to support automatic joining as a virtual meeting participant for transcription according to various embodiments of the present disclosure.

FIG. 3 is a simplified diagram showing a method 300 for calendar synchronization and integration to support automatic joining as a virtual meeting participant for transcription according to various embodiments of the present disclosure. This diagram is merely an example, which should not unduly limit the scope of the claims. One of ordinary skill in the art would recognize many variations, alternatives, and modifications. In some examples, the method 300 includes a process 302 of calendar syncing, a process 304 of obtaining calendar data, a process 306 of deriving conferencing information, a process 308 of deriving participants, a process 310 of generating speech sharing privileges, and a process 312 of storing calendar information. Although the above has been shown using a selected group of processes for the method, there can be many alternatives, modifications, and variations. In some examples, some of the processes may be expanded and/or combined. Other processes may be inserted to those noted above. Depending upon the embodiment, the sequence of processes may be interchanged with others replaced. In some examples, some or all processes of the method are performed by a computing device or a processor directed by instructions stored in memory. As an example, some or all processes of the method are performed according to instructions stored in a non-transitory computer-readable medium.

In some examples, process 302 and/or process 306 may be performed by module 110. In some examples, process 312 may be performed by module 110. In some examples, process 308 may be performed by module 116. In some examples, process 310 may be performed by module 114.

Figure 4:
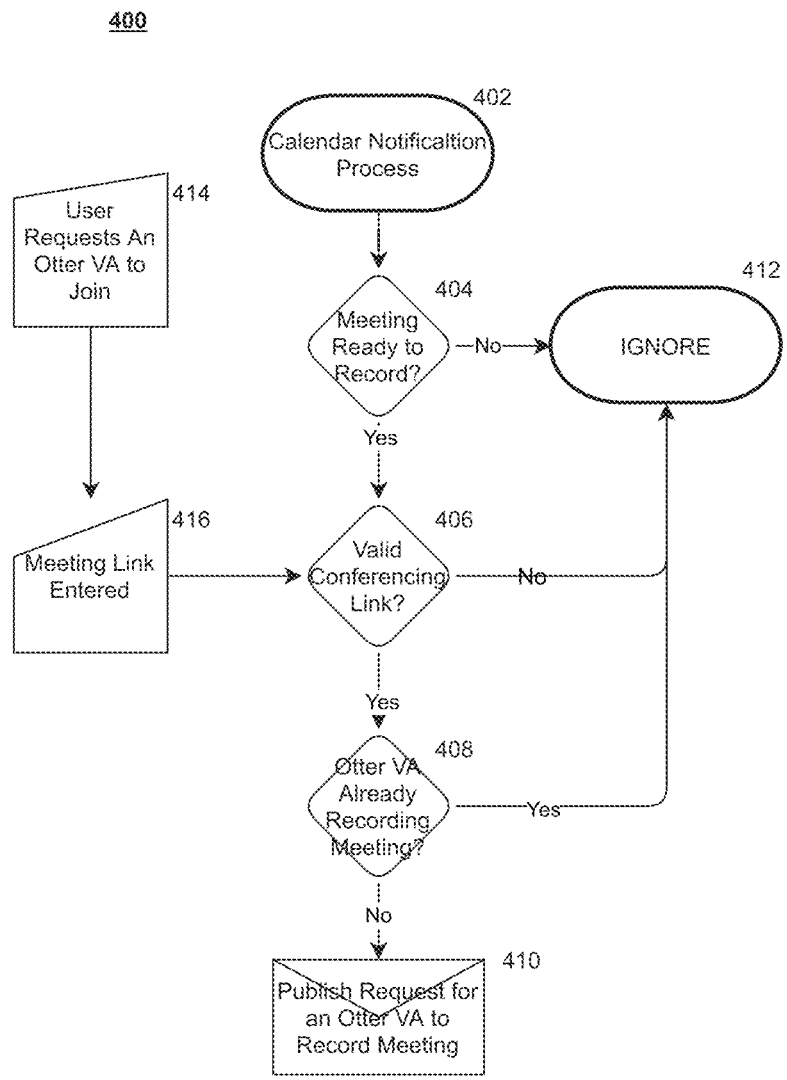
FIG. 4 is a simplified diagram showing a method for automatic joining as a virtual meeting participant for transcription leveraging calendar notification according to various embodiments of the present disclosure.

FIG. 4 is a simplified diagram showing a method 400 for automatic joining as a virtual meeting participant for transcription leveraging calendar notification according to various embodiments of the present disclosure. This diagram is merely an example, which should not unduly limit the scope of the claims. One of ordinary skill in the art would recognize many variations, alternatives, and modifications. In some examples, the method 400 includes an automatic notification to launch a virtual assistant, and may include a process 402 of initiating a calendar notification, if yes, a process 404 of determining whether a meeting is ready to be recorded, if yes, a process 406 of determining whether a conferencing link is valid, if yes, a process 408 of determining whether a virtual participant (e.g., Otter Virtual Assistant) is already recording the meeting, if no, a process 410 of publishing request for the virtual participant to record the meeting. In certain examples, the method 400 further includes a manual notification to launch the virtual assistant, such as a process 414 of receiving user request for the virtual assistant to join the meeting, and a process 416 of receiving a user-provided meeting link or conference invitation. In various examples, the method 400 further includes a process 412 of ignoring notification for meeting recordation, such as upon certain determinations at one or more of processes 404, 406, and 408. Although the above has been shown using a selected group of processes for the method, there can be many alternatives, modifications, and variations. In some examples, some of the processes may be expanded and/or combined. Other processes may be inserted to those noted above. Depending upon the embodiment, the sequence of processes may be interchanged with others replaced. In some examples, some or all processes of the method are performed by a computing device or a processor directed by instructions stored in memory. As an example, some or all processes of the method are performed according to instructions stored in a non-transitory computer-readable medium.

In some examples, process 402 and/or process 404 may be performed by module 118. In some examples, process 406 may be performed by module 120. In some examples, process 408 may be performed by module 112. In some examples, process 410 may be performed by module 122. In some examples, process 414 and/or process 416 may be performed by module 102.

Figure 5:
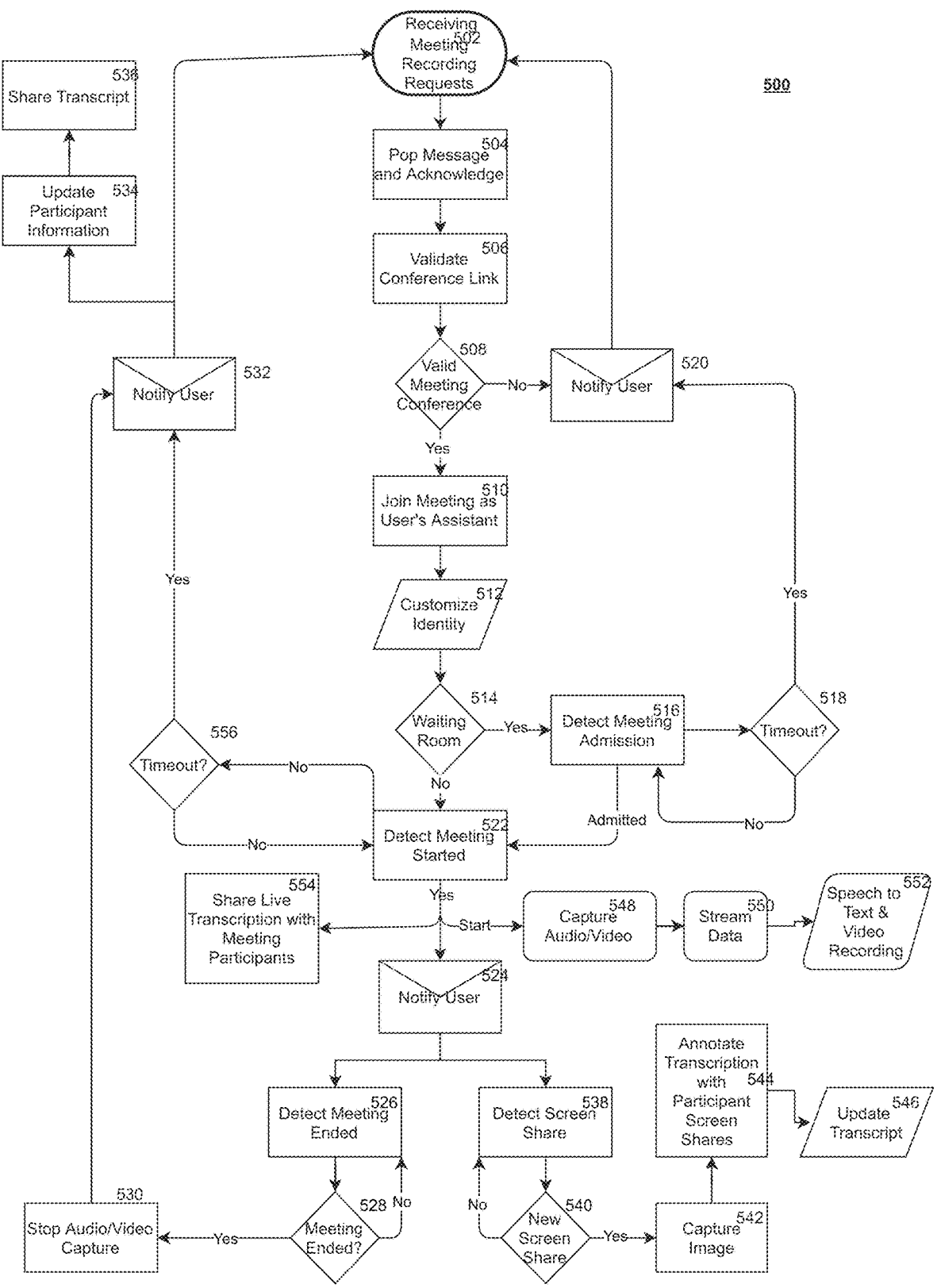
FIG. 5 is a simplified diagram showing a method for automatic joining as a virtual meeting participant for transcription according to various embodiments of the present disclosure.

FIG. 5 is a simplified diagram showing a method 500 for automatic joining as a virtual meeting participant for transcription according to various embodiments of the present disclosure. This diagram is merely an example, which should not unduly limit the scope of the claims. One of ordinary skill in the art would recognize many variations, alternatives, and modifications. In some examples, the method 500 includes a process 502 of receiving a meeting recording request (e.g., via a set of instructions using a well-defined messaging template and/or format), a process 504 of provisioning an acknowledgement indicating receipt of the record request, a process 506 of validating a conference link (e.g., provided by a user and/or a synced calendar), and a process 508 of determining whether a meeting is valid. If no, the method includes a process 520 of notifying the user. If yes, the method includes a process 510 of joining the virtual assistant into meeting at least for transcription purposes, a process 512 of customizing identity of the virtual assistant (e.g., Otter for User A), and a process 514 of entering the waiting room or waiting for the host to start a meeting. In some examples, the method 500 further includes a process 554 of sharing live transcription with one or more meeting participants, a process 548 of capturing audio and/or video of the meeting, a process 550 of streamlining audio and/or video data, and a process 552 of transforming meeting (e.g., a conversation) into text and video recording (e.g., synchronized recording with transcription). In some examples, the method 500 further includes a process 524 of notifying a user, a process 528 of detecting the meeting has ended, and a process 530 of stopping audio and/or video capturing of the meeting, and a process 532 of notifying the user. In some examples, the method 500 further includes a process 538 of detecting screen share, a process 540 of detecting a new screen share, a process 542 of capturing one or more images of the screen share, a process 544 of annotating transcription with participant screen shares, and a process 546 of updating the transcript. In some examples, the method 500 further includes a process 516 of detecting a meeting admission, a process 522 of detecting whether the meeting has started, a process 518 of detecting whether the meeting admission determination has been timed-out, a process 556 of detecting whether the meeting start determination has been timed-out, a process 532 of notifying the user, a process 534 of updating participant information, and a process 536 of sharing the transcript (e.g., to the user and/or the meeting participants). Although the above has been shown using a selected group of processes for the method, there can be many alternatives, modifications, and variations. In some examples, some of the processes may be expanded and/or combined. Other processes may be inserted to those noted above. Depending upon the embodiment, the sequence of processes may be interchanged with others replaced. In some examples, some or all processes of the method are performed by a computing device or a processor directed by instructions stored in memory. As an example, some or all processes of the method are performed according to instructions stored in a non-transitory computer-readable medium.

In some examples, process 502, process 504, process 506, and/or process 508 may be performed by module 124. In some examples, process 510 may be performed by module 128. In some examples, process 512 may be performed by module 138. In some examples, process 514, process 516, and/or process 518 may be performed by module 140. In some examples, process 520, process 524, process 532, and/or process 546 may be performed by module 106. In some examples, process 522 and/or process 556 may be performed by module 142. In some examples, process 554 may be performed by module 148. In some examples, process 548, and/or process 530 may be performed by module 130 and/or module 132. In some examples, process 550 may be performed by module 104. In some examples, process 552 may be performed by module 104. In some examples, process 526 and/or process 528 may be performed by module 144. In some examples, process 534 may be performed by module 116. In some examples, process 536 may be performed by module 114. In some examples, process 538 and/or process 540 may be performed by module 146. In some examples, process 542 may be performed by module 134. In some examples, process 544 may be performed by module 126.

In some examples, the method 500 autojoins a virtual meeting participant (e.g., a virtual assistant) into a meeting to transcribe speech, capture, record, and/or stream text, capture, record, and/or stream audio, capture, record, and/or stream video, share meeting notes and/or annotations, and notifying a user and/or meeting participants.

Figure 6:
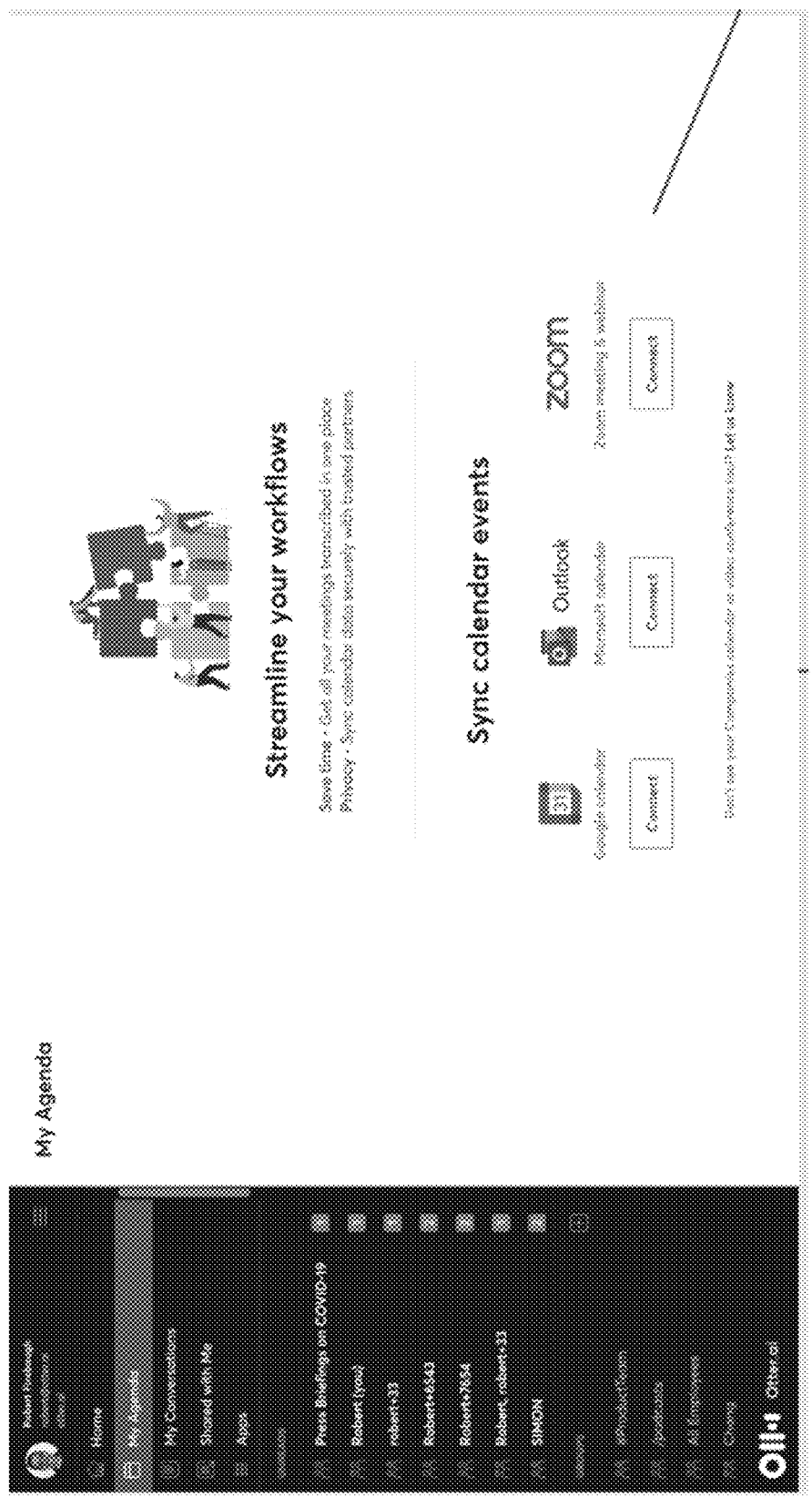
FIG. 6 is a simplified diagram showing a user interface with calendar integration according to various embodiments of the present disclosure.

FIG. 6 is a simplified diagram showing a user interface with calendar integration according to various embodiments of the present disclosure. One of ordinary skill in the art would recognize many variations, alternatives, and modifications. As depicted, systems and/or methods of the present disclosure may enable a user to sync one or more calendars with a virtual assistant module such that the virtual assistant module may join, such as automatically join, one or more meetings and/or events of the synced one or more calendars. In some examples, a Google calendar, a Microsoft calendar, and/or a Zoom calendar may be synced.

Figure 7:
FIG. 7 is a simplified diagram showing a user interface with calendar integration according to various embodiments of the present disclosure.

FIG. 7 is a simplified diagram showing a user interface with calendar integration according to various embodiments of the present disclosure. One of ordinary skill in the art would recognize many variations, alternatives, and modifications. As depicted, systems and/or methods of the present disclosure may enable a user to, such as via a master calendar (e.g., an Otter calendar), monitor the status of the virtual assistant in one or more synced events and/or meetings. In some examples, the master calendar shows a user whether the virtual assistant has joined meeting, is in a meeting, has completed transcribing a meeting, and/or is scheduled to join a meeting.

Figure 8:
FIG. 8 is a simplified diagram showing a user interface with provisioning automatic joining as a virtual meeting participant according to various embodiments of the present disclosure.
Figure 8:
Figure 8:

FIG. 8 is a simplified diagram showing a user interface with provisioning automatic joining as a virtual meeting participant according to various embodiments of the present disclosure. One of ordinary skill in the art would recognize many variations, alternatives, and modifications. As depicted, systems and/or methods of the present disclosure may enable a user to select one or more virtual assistant settings, such as to automatically send share-notes links to meeting participants, to auto-join meetings, such as synced meetings, and/or personalized virtual assistant name.

Aspect 1. A computer-implemented method for joining a virtual participant in a conversation, the method comprising: identifying a first conversation scheduled to be participated by a first group of actual participants; joining a first virtual participant into the first conversation; obtaining, via the first virtual participant, a first set of audio data associated with the first conversation while the first conversation occurs; transcribing, via the first virtual participant, the first set of audio data into a first set of text data while the first conversation occurs; and presenting the first set of text data to the first group of actual participants while the first conversation occurs.

Aspect 2. The computer-implemented method of aspect 1, wherein: the identifying the first conversation includes obtaining schedule information associated with the first conversation from a synced calendar; and the joining the first virtual participant includes automatically joining the first virtual participant according to the schedule information such that the first virtual participant joins the conversation at least before a start time indicated by the schedule information.

Aspect 3. The computer-implemented method of any of aspects 1-2, wherein: the identifying the first conversation further includes obtaining credential information associated with the first conversation; and the joining the first virtual participant further includes automatically joining the first virtual participant according to the credential information and user information associated with the user such that the first virtual participant is identified in association with the user in a participant list presented to the one or more active participants during the conversation.

Aspect 4. The computer-implemented method of any of aspects 1-3, further comprising: joining a second virtual participant into the first conversation; obtaining, via the second virtual participant, a second set of audio data associated with the first conversation while the first conversation occurs; transcribing, via the second virtual participant, the second set of audio data into a second set of text data while the first conversation occurs; and generating a master transcription based at least in part upon the first set of text data and the second set of text data while they are transcribed; and presenting the master transcription to the first group of actual participants while the first conversation occurs.

Aspect 5. The computer-implemented method of aspect 4, wherein: the transcribing the first set of audio data includes: obtaining a first set of voiceprints associated with a first subgroup of actual participants of the first group of actual participants; and transcribing the first set of audio data into the first set of text data based at least in part upon the first set of voiceprints; and the transcribing the second set of audio data includes: obtaining a second set of voiceprints associated with a second subgroup of actual participants of the second group of actual participants; and transcribing the second set of audio data into the second set of text data based at least in part upon the second set of voiceprints.

Aspect 6. The computer-implemented method of aspect 5, wherein: the generating the master transcription includes: prioritizing the first set of text data over the second set of text data as the text data presented in the master transcription for audio data associated with the first subgroup of actual participants as the audio source; and prioritizing the second set of text data over the first set of text data as the text data presented in the master transcription for audio data associated with the second subgroup of actual participants as the audio source.

Aspect 7. The computer-implemented method of any of aspects 5-6, wherein each voiceprint of the first set of voiceprints and the second set of voiceprints includes an acoustic model and a language model associated with an actual participant of the first group of actual participants.

Aspect 8. The computer-implemented method of any of aspects 1-7, further comprising: obtaining, via the first virtual participant, a first set of visual data associated with the first conversation while the first conversation occurs; transforming, via the first virtual participant, the first set of visual data into a first set of annotated visual data while the first conversation occurs; and presenting the first set of annotated visual data to the first group of actual participants while the first conversation occurs.

Aspect 9. The computer-implemented method of aspect 8, wherein the obtaining the first set of visual data includes: obtaining an audio capture command or a textual capture command from an actual participant of the first group of actual participants; and obtaining a first visual data upon obtaining the audio capture command or the textual capture command.

Aspect 10. The computer-implemented method of any of aspects 1-9, further comprising: identifying a second conversation scheduled to be participated by a second group of actual participants; joining the first virtual participant into the second conversation; obtaining, via the first virtual participant, a third set of audio data associated with the second conversation while the second conversation occurs; transcribing, via the first virtual participant, the third set of audio data into a third set of text data while the second conversation occurs; and presenting the third set of text data to the second group of actual participants while the second conversation occurs.

Aspect 11. The computer-implemented method of aspect 10, wherein at least a part of the second conversation occurs simultaneously as the first conversation occurs.

Aspect 12. The computer-implemented method of any of aspects 1-11, wherein: the presenting the first set of text data includes presenting the first set of text data to be searchable, navigable, annotatable, or modifiable, while the conversation occurs.

Aspect 13. The computer-implemented method of aspect 12, further comprising: obtaining, from one or more actual participants of the first group of actual participants, one or more modifications and/or one or more annotations; updating the first set of text data according to the one or more modifications and/or one or more annotations; and presenting the updated the first set of text data to the first group of actual participants.

Aspect 14. The computer-implemented method of any of aspects 1-13, further comprising: presenting the first set of text data to a group of non-participants; wherein the first group of actual participants is the source of the first set of audio data and the group of non-participants is not.

Aspect 15. The computer-implemented method of any of aspects 1-14, further comprising: generating a complete transcription upon conclusion of the first conversation; and transmitting the complete transcription to the first group of actual participants.

Aspect 16. The computer-implemented method of aspect 15, wherein the generating a complete transcription includes synchronizing the complete transcription with a complete audio data associated with the entire first conversation.

Aspect 17. The computer-implemented method of any of aspects 15-16, wherein the generating a complete transcription includes automatically segmenting the complete transcription into a plurality of segments when speaker change occurs or natural pause occurs.

Aspect 18. The computer-implemented method of any of aspects 15-17, wherein the generating a complete transcription includes: transcribing the first set of audio data in conjunctively with each other to extrapolate one or more tones; and annotating the one or more tones as part of the complete transcription.

Aspect 19. A computing system for joining a virtual participant in a conversation, the computing system comprising: one or more processors; and a memory storing instructions that, upon execution by the one or more processors, cause the computing system to perform one or more processes including: identifying a first conversation scheduled to be participated by a first group of actual participants; joining a first virtual participant into the first conversation; obtaining, via the first virtual participant, a first set of audio data associated with the first conversation while the first conversation occurs; transcribing, via the first virtual participant, the first set of audio data into a first set of text data while the first conversation occurs; and presenting the first set of text data to the first group of actual participants while the first conversation occurs.

Aspect 20. The computing system of aspect 19, wherein: the identifying the first conversation includes obtaining schedule information associated with the first conversation from a synced calendar; and the joining the first virtual participant includes automatically joining the first virtual participant according to the schedule information such that the first virtual participant joins the conversation at least before a start time indicated by the schedule information.

Aspect 21. The computing system of any of aspects 19-20, wherein: the identifying the first conversation further includes obtaining credential information associated with the first conversation; and the joining the first virtual participant further includes automatically joining the first virtual participant according to the credential information and user information associated with the user such that the first virtual participant is identified in association with the user in a participant list presented to the one or more active participants during the conversation.

Aspect 22. The computing system of any of aspects 19-21, wherein the one or more processes further includes: joining a second virtual participant into the first conversation; obtaining, via the second virtual participant, a second set of audio data associated with the first conversation while the first conversation occurs; transcribing, via the second virtual participant, the second set of audio data into a second set of text data while the first conversation occurs; and generating a master transcription based at least in part upon the first set of text data and the second set of text data while they are transcribed; and presenting the master transcription to the first group of actual participants while the first conversation occurs.

Aspect 23. The computing system of aspect 22, wherein: the transcribing the first set of audio data includes: obtaining a first set of voiceprints associated with a first subgroup of actual participants of the first group of actual participants; and transcribing the first set of audio data into the first set of text data based at least in part upon the first set of voiceprints; and the transcribing the second set of audio data includes: obtaining a second set of voiceprints associated with a second subgroup of actual participants of the second group of actual participants; and transcribing the second set of audio data into the second set of text data based at least in part upon the second set of voiceprints.

Aspect 24. The computing system of aspect 23, wherein: the generating the master transcription includes: prioritizing the first set of text data over the second set of text data as the text data presented in the master transcription for audio data associated with the first subgroup of actual participants as the audio source; and prioritizing the second set of text data over the first set of text data as the text data presented in the master transcription for audio data associated with the second subgroup of actual participants as the audio source.

Aspect 25. The computing system of any of aspects 23-24, wherein each voiceprint of the first set of voiceprints and the second set of voiceprints includes an acoustic model and a language model associated with an actual participant of the first group of actual participants.

Aspect 26. The computing system of any of aspects 19-25, wherein the one or more processes further includes: obtaining, via the first virtual participant, a first set of visual data associated with the first conversation while the first conversation occurs; transforming, via the first virtual participant, the first set of visual data into a first set of annotated visual data while the first conversation occurs; and presenting the first set of annotated visual data to the first group of actual participants while the first conversation occurs.

Aspect 27. The computing system of aspect 26, wherein the obtaining the first set of visual data includes: obtaining an audio capture command or a textual capture command from an actual participant of the first group of actual participants; and obtaining a first visual data upon obtaining the audio capture command or the textual capture command.

Aspect 28. The computing system of any of aspects 19-27, wherein the one or more processes further includes: identifying a second conversation scheduled to be participated by a second group of actual participants; joining the first virtual participant into the second conversation; obtaining, via the first virtual participant, a third set of audio data associated with the second conversation while the second conversation occurs; transcribing, via the first virtual participant, the third set of audio data into a third set of text data while the second conversation occurs; and presenting the third set of text data to the second group of actual participants while the second conversation occurs.

Aspect 29. The computing system of aspect 28, wherein at least a part of the second conversation occurs simultaneously as the first conversation occurs.

Aspect 30. The computing system of any of aspects 19-29, wherein: the presenting the first set of text data includes presenting the first set of text data to be searchable, navigable, annotatable, or modifiable, while the conversation occurs.

Aspect 31. The computing system of aspect 30, wherein the one or more processes further includes: obtaining, from one or more actual participants of the first group of actual participants, one or more modifications and/or one or more annotations; updating the first set of text data according to the one or more modifications and/or one or more annotations; and presenting the updated the first set of text data to the first group of actual participants.

Aspect 32. The computing system of any of aspects 19-31, wherein the one or more processes further includes: presenting the first set of text data to a group of non-participants; wherein the first group of actual participants is the source of the first set of audio data and the group of non-participants is not.

Aspect 33. The computing system of any of aspects 19-32, wherein the one or more processes further includes: generating a complete transcription upon conclusion of the first conversation; and transmitting the complete transcription to the first group of actual participants.

Aspect 34. The computing system of aspect 33, wherein the generating a complete transcription includes synchronizing the complete transcription with a complete audio data associated with the entire first conversation.

Aspect 35. The computing system of any of aspects 33-34, wherein the generating a complete transcription includes automatically segmenting the complete transcription into a plurality of segments when speaker change occurs or natural pause occurs.

Aspect 36. The computing system of any of aspects 33-35, wherein the generating a complete transcription includes: transcribing the first set of audio data in conjunctively with each other to extrapolate one or more tones; and annotating the one or more tones as part of the complete transcription.

Aspect 37. A non-transitory computer-readable medium storing instructions for joining a virtual participant in a conversation, the instructions upon execution by one or more processors of a computing system, cause the computing system to perform one or more processes including:

identifying a first conversation scheduled to be participated by a first group of actual participants; joining a first virtual participant into the first conversation; obtaining, via the first virtual participant, a first set of audio data associated with the first conversation while the first conversation occurs; transcribing, via the first virtual participant, the first set of audio data into a first set of text data while the first conversation occurs; and presenting the first set of text data to the first group of actual participants while the first conversation occurs.

Aspect 38. The non-transitory computer-readable medium of aspect 37, wherein: the identifying the first conversation includes obtaining schedule information associated with the first conversation from a synced calendar; and the joining the first virtual participant includes automatically joining the first virtual participant according to the schedule information such that the first virtual participant joins the conversation at least before a start time indicated by the schedule information.

Aspect 39. The non-transitory computer-readable medium of any of aspects 37-38, wherein: the identifying the first conversation further includes obtaining credential information associated with the first conversation; and the joining the first virtual participant further includes automatically joining the first virtual participant according to the credential information and user information associated with the user such that the first virtual participant is identified in association with the user in a participant list presented to the one or more active participants during the conversation.

Aspect 40. The non-transitory computer-readable medium of any of aspects 37-39, wherein the one or more processes further includes: joining a second virtual participant into the first conversation; obtaining, via the second virtual participant, a second set of audio data associated with the first conversation while the first conversation occurs; transcribing, via the second virtual participant, the second set of audio data into a second set of text data while the first conversation occurs; and generating a master transcription based at least in part upon the first set of text data and the second set of text data while they are transcribed; and presenting the master transcription to the first group of actual participants while the first conversation occurs.

Aspect 41. The non-transitory computer-readable medium of aspect 40, wherein: the transcribing the first set of audio data includes: obtaining a first set of voiceprints associated with a first subgroup of actual participants of the first group of actual participants; and transcribing the first set of audio data into the first set of text data based at least in part upon the first set of voiceprints; and the transcribing the second set of audio data includes: obtaining a second set of voiceprints associated with a second subgroup of actual participants of the second group of actual participants; and transcribing the second set of audio data into the second set of text data based at least in part upon the second set of voiceprints.

Aspect 42. The non-transitory computer-readable medium of aspect 41, wherein: the generating the master transcription includes: prioritizing the first set of text data over the second set of text data as the text data presented in the master transcription for audio data associated with the first subgroup of actual participants as the audio source; and prioritizing the second set of text data over the first set of text data as the text data presented in the master transcription for audio data associated with the second subgroup of actual participants as the audio source.

Aspect 43. The non-transitory computer-readable medium of any of aspects 41-42, wherein each voiceprint of the first set of voiceprints and the second set of voiceprints includes an acoustic model and a language model associated with an actual participant of the first group of actual participants.

Aspect 44. The non-transitory computer-readable medium of any of aspects 37-43, wherein the one or more processes further includes: obtaining, via the first virtual participant, a first set of visual data associated with the first conversation while the first conversation occurs; transforming, via the first virtual participant, the first set of visual data into a first set of annotated visual data while the first conversation occurs; and presenting the first set of annotated visual data to the first group of actual participants while the first conversation occurs.

Aspect 45. The non-transitory computer-readable medium of aspect 44, wherein the obtaining the first set of visual data includes: obtaining an audio capture command or a textual capture command from an actual participant of the first group of actual participants; and obtaining a first visual data upon obtaining the audio capture command or the textual capture command.

Aspect 46. The non-transitory computer-readable medium of any of aspects 37-45, wherein the one or more processes further includes: identifying a second conversation scheduled to be participated by a second group of actual participants; joining the first virtual participant into the second conversation; obtaining, via the first virtual participant, a third set of audio data associated with the second conversation while the second conversation occurs; transcribing, via the first virtual participant, the third set of audio data into a third set of text data while the second conversation occurs; and presenting the third set of text data to the second group of actual participants while the second conversation occurs.

Aspect 47. The non-transitory computer-readable medium of aspect 46, wherein at least a part of the second conversation occurs simultaneously as the first conversation occurs.

Aspect 48. The non-transitory computer-readable medium of any of aspects 37-47, wherein: the presenting the first set of text data includes presenting the first set of text data to be searchable, navigable, annotatable, or modifiable, while the conversation occurs.

Aspect 49. The non-transitory computer-readable medium of aspect 48, wherein the one or more processes further includes: obtaining, from one or more actual participants of the first group of actual participants, one or more modifications and/or one or more annotations; updating the first set of text data according to the one or more modifications and/or one or more annotations; and presenting the updated the first set of text data to the first group of actual participants.

Aspect 50. The non-transitory computer-readable medium of any of aspects 37-49, wherein the one or more processes further includes: presenting the first set of text data to a group of non-participants; wherein the first group of actual participants is the source of the first set of audio data and the group of non-participants is not.

Aspect 51. The non-transitory computer-readable medium of any of aspects 37-50, wherein the one or more processes further includes: generating a complete transcription upon conclusion of the first conversation; and transmitting the complete transcription to the first group of actual participants.

Aspect 52. The non-transitory computer-readable medium of aspect 51, wherein the generating a complete transcription includes synchronizing the complete transcription with a complete audio data associated with the entire first conversation.

Aspect 53. The non-transitory computer-readable medium of any of aspects 51-52, wherein the generating a complete transcription includes automatically segmenting the complete transcription into a plurality of segments when speaker change occurs or natural pause occurs.

Aspect 54. The non-transitory computer-readable medium of any of aspects 51-53, wherein the generating a complete transcription includes: transcribing the first set of audio data in conjunctively with each other to extrapolate one or more tones; and annotating the one or more tones as part of the complete transcription.

For example, some or all components of various embodiments of the present disclosure each are, individually and/or in combination with at least another component, implemented using one or more software components, one or more hardware components, and/or one or more combinations of software and hardware components. As an example, some or all components of various embodiments of the present disclosure each are, individually and/or in combination with at least another component, implemented in one or more circuits, such as one or more analog circuits and/or one or more digital circuits. For example, while the embodiments described above refer to particular features, the scope of the present disclosure also includes embodiments having different combinations of features and embodiments that do not include all of the described features. As an example, various embodiments and/or examples of the present disclosure can be combined.

Additionally, the methods and systems described herein may be implemented on many different types of processing devices by program code comprising program instructions that are executable by the device processing subsystem. The software program instructions may include source code, object code, machine code, or any other stored data that is operable to cause a processing system to perform the methods and operations described herein. Certain implementations may also be used, however, such as firmware or even appropriately designed hardware configured to perform the methods and systems described herein.

The systems' and methods' data (e.g., associations, mappings, data input, data output, intermediate data results, final data results) may be stored and implemented in one or more different types of computer-implemented data stores, such as different types of storage devices and programming constructs (e.g., SSD, RAM, ROM, EEPROM, Flash memory, flat files, databases, programming data structures, programming variables, IF-THEN (or similar type) statement constructs, application programming interface). It is noted that data structures describe formats for use in organizing and storing data in databases, programs, memory, or other computer-readable media for use by a computer program.

The systems and methods may be provided on many different types of computer-readable media including computer storage mechanisms (e.g., CD-ROM, diskette, RAM, flash memory, computer's hard drive, DVD) that contain instructions (e.g., software) for use in execution by a processor to perform the methods' operations and implement the systems described herein. The computer components, software modules, functions, data stores and data structures described herein may be connected directly or indirectly to each other in order to allow the flow of data needed for their operations. It is also noted that a module or processor includes a unit of code that performs a software operation and can be implemented for example as a subroutine unit of code, or as a software function unit of code, or as an object (as in an object-oriented paradigm), or as an applet, or in a computer script language, or as another type of computer code. The software components and/or functionality may be located on a single computer or distributed across multiple computers depending upon the situation at hand.

The computing system can include client devices and servers. A client device and server are generally remote from each other and typically interact through a communication network. The relationship of client device and server arises by virtue of computer programs running on the respective computers and having a client device-server relationship to each other.

This specification contains many specifics for particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations, one or more features from a combination can in some cases be removed from the combination, and a combination may, for example, be directed to a subcombination or variation of a subcombination.

Similarly, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Additionally, certain embodiments are described herein as including logic or a number of routines, subroutines, applications, or instructions. These may constitute either software (e.g., code embodied on a non-transitory, machine-readable medium) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that may be permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that may be temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules may provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it may be communicatively coupled. A further hardware module may then, at a later time, access the memory device to retrieve and process the stored output. Hardware modules may also initiate communications with input or output devices, and may operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment, or as a server farm), while in other embodiments the processors may be distributed across a number of locations.

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

Although specific embodiments of the present disclosure have been described, it will be understood by those of skill in the art that there are other embodiments that are equivalent to the described embodiments. Accordingly, it is to be understood that the present disclosure is not to be limited by the specific illustrated embodiments.

What is claimed is:

1. A computer-implemented method for joining a virtual participant in a conversation, the method comprising:
   identifying a first conversation scheduled to be participated by a first group of actual participants by at least obtaining schedule information associated with the first conversation from a synchronized calendar;
   automatically joining a first virtual participant into the first conversation at least before a start time indicated by the schedule information by:
      automatically opening a meeting application for the first virtual participant;
      automatically entering credential information associated with the first conversation and user information associated with the first virtual participant; and
      automatically joining the first virtual participant into the first conversation;
   obtaining, via the first virtual participant configured to capture audio data, a first set of audio data associated with the first conversation while the first conversation occurs;
   transcribing, via the first virtual participant, the first set of audio data into a first set of text data while the first conversation occurs; and
   presenting the first set of text data to the first group of actual participants while the first conversation occurs.

2. The computer-implemented method of claim 1, wherein the automatically opening a meeting application includes:
   determining, before the start time, that the first conversation is about to start; and
   in response to determining that the first conversation is about to start, automatically opening the meeting application before the start time.

3. The computer-implemented method of claim 1, wherein:
   the automatically joining a first virtual participant into the first conversation at least before a start time indicated by the schedule information further includes automatically joining the first virtual participant in response to identifying the first virtual participant in association with a user in a participant list presented to one or more active participants during the first conversation.

4. The computer-implemented method of claim 1, further comprising:
   automatically joining a second virtual participant into the first conversation by at least:
      automatically opening the meeting application for the second virtual participant;

automatically entering the credential information associated with the first conversation and user information associated with the second virtual participant; and automatically joining the second virtual participant into the first conversation;

obtaining, via the second virtual participant, a second set of audio data associated with the first conversation while the first conversation occurs;

transcribing, via the second virtual participant, the second set of audio data into a second set of text data while the first conversation occurs;

generating a master transcription based at least in part upon the first set of text data and the second set of text data; and presenting the master transcription to the first group of actual participants while the first conversation occurs.

5. The computer-implemented method of claim 4, wherein:

the transcribing, via the first virtual participant, the first set of audio data includes:

obtaining a first set of voiceprints associated with a first subgroup of actual participants of the first group of actual participants; and transcribing the first set of audio data into the first set of text data based at least in part upon the first set of voiceprints; and the transcribing, via the second virtual participant, the second set of audio data includes:

obtaining a second set of voiceprints associated with a second subgroup of actual participants of the first group of actual participants; and transcribing the second set of audio data into the second set of text data based at least in part upon the second set of voiceprints.

6. The computer-implemented method of claim 5, wherein each voiceprint of the first set of voiceprints and the second set of voiceprints includes an acoustic model and a language model associated with an actual participant of the first group of actual participants.

7. The computer-implemented method of claim 1, further comprising:

obtaining, via the first virtual participant, a set of visual data associated with the first conversation while the first conversation occurs;

transforming, via the first virtual participant, the set of visual data into a set of annotated visual data while the first conversation occurs; and presenting the set of annotated visual data to the first group of actual participants while the first conversation occurs.

8. The computer-implemented method of claim 7, wherein the obtaining, via the first virtual participant, a set of visual data includes:

obtaining an audio capture command or a textual capture command from an actual participant of the first group of actual participants; and obtaining first visual data upon obtaining the audio capture command or the textual capture command.

9. The computer-implemented method of claim 1, further comprising:

identifying a second conversation scheduled to be participated by a second group of actual participants;

joining the first virtual participant into the second conversation;

obtaining, via the first virtual participant, a third set of audio data associated with the second conversation while the second conversation occurs;

transcribing, via the first virtual participant, the third set of audio data into a third set of text data while the second conversation occurs; and presenting the third set of text data to the second group of actual participants while the second conversation occurs.

10. The computer-implemented method of claim 9, wherein at least a part of the second conversation occurs simultaneously as the first conversation occurs.

11. The computer-implemented method of claim 1, wherein:

the presenting the first set of text data includes presenting the first set of text data to be searchable, navigable, annotatable, or modifiable, while the first conversation occurs.

12. The computer-implemented method of claim 11, further comprising:

obtaining, from one or more actual participants of the first group of actual participants, one or more modifications and/or one or more annotations;

updating the first set of text data according to the one or more modifications and/or the one or more annotations; and presenting the updated first set of text data to the first group of actual participants.

13. The computer-implemented method of claim 1, further comprising:

presenting the first set of text data to a group of non-participants;

wherein the first group of actual participants is a source of the first set of audio data and the group of non-participants is not.

14. The computer-implemented method of claim 1, further comprising:

generating a complete transcription upon conclusion of the first conversation; and transmitting the complete transcription to the first group of actual participants.

15. The computer-implemented method of claim 14, wherein the generating a complete transcription includes synchronizing the complete transcription with a complete audio data associated with the first conversation.

16. The computer-implemented method of claim 14, wherein the generating a complete transcription includes automatically segmenting the complete transcription into a plurality of segments when a speaker change occurs or a natural pause occurs.

17. A computing system for joining a virtual participant in a conversation, the computing system comprising:

one or more processors; and a memory storing instructions that, upon execution by the one or more processors, cause the computing system to perform one or more processes including:

identifying a conversation scheduled to be participated by a group of actual participants by at least obtaining schedule information associated with the conversation from a synchronized calendar;

automatically joining a virtual participant into the conversation at least before a start time indicated by the schedule information by:

automatically opening a meeting application for the virtual participant;

automatically entering credential information associated with the conversation and user information associated with the virtual participant; and automatically joining the virtual participant into the conversation;

obtaining, via the virtual participant configured to capture audio data, a set of audio data associated with the conversation while the conversation occurs;

transcribing, via the virtual participant, the set of audio data into a set of text data while the conversation occurs; and presenting the set of text data to the group of actual participants while the conversation occurs.

18. A non-transitory computer-readable medium storing instructions for joining a virtual participant in a conversation, the instructions upon execution by one or more processors of a computing system, cause the computing system to perform one or more processes including:

identifying a conversation scheduled to be participated by a group of actual participants by at least obtaining schedule information associated with the conversation from a synchronized calendar;

automatically joining a virtual participant into the conversation at least before a start time indicated by the schedule information by:

automatically opening a meeting application for the virtual participant;

automatically entering credential information associated with the conversation and user information associated with the virtual participant; and automatically joining the virtual participant into the conversation;

obtaining, via the virtual participant configured to capture audio data, a set of audio data associated with the conversation while the conversation occurs;

transcribing, via the virtual participant, the set of audio data into a set of text data while the conversation occurs; and presenting the set of text data to the group of actual participants while the conversation occurs.

* * * * *